A. S. WEAVER.
GRAIN BINDER.

No. 262,867. Patented Aug. 15, 1882.

A. S. WEAVER.
GRAIN BINDER.

No. 262,867. Patented Aug. 15, 1882.

Witnesses:

Inventor:
Andrew S. Weaver
By West & Bond Attys.

A. S. WEAVER.
GRAIN BINDER.

No. 262,867. Patented Aug. 15, 1882.

Witnesses:

Inventor:
Andrus S. Weaver
By West & Bond Attys.

UNITED STATES PATENT OFFICE.

ANDRUS S. WEAVER, OF JOY, NEW YORK, ASSIGNOR TO HIMSELF AND CHARLES H. MORSE, OF CHICAGO, ILLINOIS.

GRAIN-BINDER.

SPECIFICATION forming part of Letters Patent No. 262,867, dated August 15, 1882.

Application filed February 6, 1880.

*To all whom it may concern:*

Be it known that I, ANDRUS S. WEAVER, residing at Joy, in the county of Wayne and State of New York, and a citizen of the United States, have invented new and useful Improvements in Grain-Binders, of which the following is a full description, reference being had to the accompanying drawings, in which—

The mechanism which I have devised is designed to be used in binding grain with a cord. It may be applied to and used with most of the self-raking reaping-machines now in use, as well as to harvesters. The principal parts, except the needle-arm and compressor, are located beneath the platform or table on which the cut grain is received.

In the drawings, A represents a metal plate, upon which the several parts of my invention are mounted.

B is a standard secured to the plate A. As shown, it is hollow.

C is a cog-wheel having a hub, $a$, which rotates on the standard B.

$b$ is a flange extending up from the rim of the wheel C. As shown, all the space between the flange $b$ and the hub $a$ is filled with metal $c$, having a concave surface; but the flange extends above the highest point of the surface $c$, and is beveled at the top.

$d$ is a channel, in which the end of a rear extension on the needle-arm moves and is guided.

$e$ is a fixed collar on the standard B.

D is a sleeve rotating on the standard B.

$f$ is an arm, of the form shown, extending out from the lower end of the sleeve D.

$g$ is a vertical arm, permanently secured to the sleeve D. It may be cast with D. On the back side of $g$ is a circular recess to receive the disk $h$, which is secured therein by a central bolt, but so that it can turn easily.

E is a compressor consisting of a spring-arm secured to the disk $h$. On the outer end of this arm are one or more curved pieces, $i$, to hold the grain while being compressed.

F is another sleeve, rotating on the standard B.

$j$ is a slot in the lower end of this sleeve F, and $k$ is a pin secured to the upper edge of the collar or sleeve D and extending into the slot $j$.

$l$ is another pin secured to the standard B, and projecting into a slot or recess, $m$, in the upper edge of the sleeve F.

$n$ is a fixed collar to keep the parts below in place.

G is the needle-arm, made, as shown, in two parts, pivoted to the sleeve F at $o$ $o$. There is a rearward extension, H, of the needle-arm, which is carried downward, and is provided at the lower end with a friction-roller, which travels in the channel $d$.

I is the needle. The cord passes through holes $p$ $p$, and also through a hole, $p''$, in the lower end thereof, which is indicated by dotted lines in Fig. 28.

J is a rod secured to a piece of metal, $q'$, which fits loosely in the top of the standard B, and can be secured in any given position by a set-screw. In the outer end of this rod J is a hole for the cord, and on its top is a tension device, $r$, for the cord. $s$ is a pin, on which a spool of cord may be placed. $t$ is an arm at the end of the needle-arm. It serves as a guide and aids in removing the bundle.

Figures 7, 10:
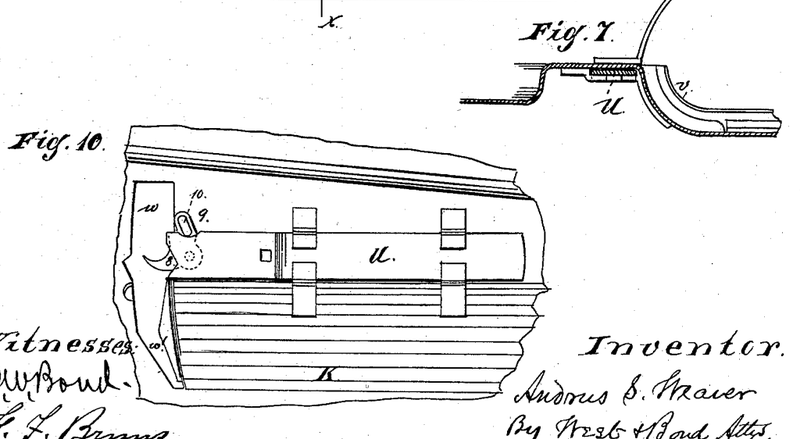
Fig. 7 is a section at line $x$ of Fig. 6.
Fig. 10, an under side view of part of the platform and bar U.
Figures 11, 14:
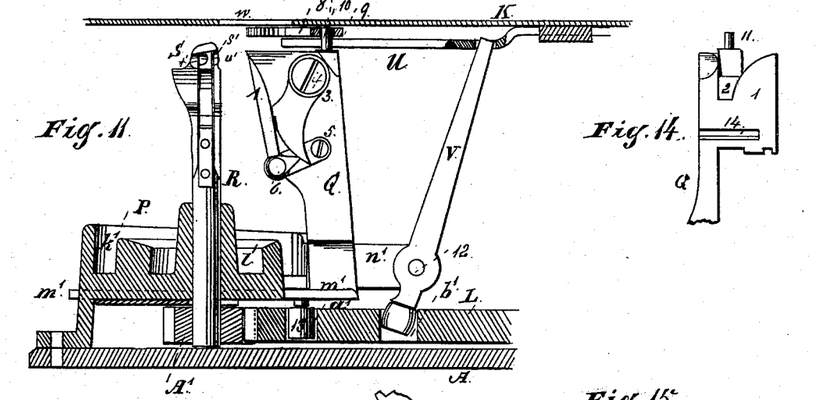
Fig. 11 is a section at line $x$ of Fig. 1.
Figs. 14, 15, 16, and 17 are details.

K is the platform or table on which the cut grain is received. In it is a groove or channel, $u$, in which the end of the needle travels. To facilitate the holding of the grain while being bound, I curve the platform, as shown at $v$, Fig. 7. There is an opening, $w$, in the highest part, through which the needle passes, and an opening, $w'$, in the curved part $v$, through which the needle passes out after the bundle has been bound. $w$ and $w'$ together form one long slot.

Figures 29, 30, 31:
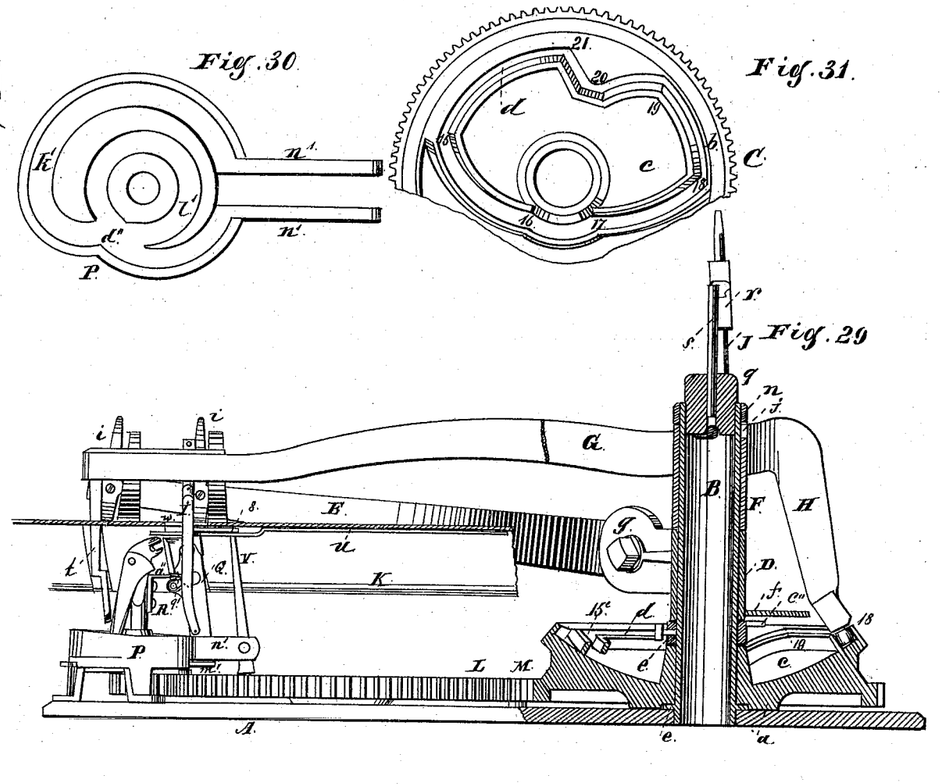
Fig. 29 is an elevation showing the parts in the position which they occupy after the needle has passed down through the gripper during the operation of binding, the platform, standard, and some other parts being in section.
Figs. 30 and 31 are details, Fig. 30 being enlarged.

The arm $t$ is formed as shown in Fig. 29, there being an offset near the lower end. It passes down with the needle-arm through an opening or open slot in the elevated part of the table, from which it can pass out horizontally after the bundle has been bound. A light spring may be arranged to aid in guiding and holding the arm $t$ in place while the needle is in the opening $w$, but from which it can be released by a slight pressure when the time comes for it to be carried out over the table.

$b''$ is an arm on the rear end of the compressor, which at the proper time comes in contact with a projection, $c'''$, on the fixed collar $e$.

L is a cog-wheel, which may be driven in any suitable manner, and from and by which the mechanism is operated.

M is a small cog-wheel, which engages with both of the wheels C and L. In the face of the wheel L are two continuous grooves or channels, $a'$ $b'$.

N is a post or pin secured to the face of the wheel L.

O is a connecting rod or bar, one end of which is pivoted to the projection or arm $f$ on the sleeve D at $c'$. In the other end of this rod O is a slot, $d'$, through which the pin or post N passes. I have made this post in two parts—one, $e'$, is fixed, the other, $f'$, passes through a hole in $e'$, and can move therein up and down. The upper end of $f'$ is larger than the remainder. The lower part is flattened at $g'$, and a pin, $h'$, prevents it from turning around, this pin passing to the flattened portion $g'$, but not through $f'$. (See Fig. 16.)

Figures 12, 13, 15, 16, 17:
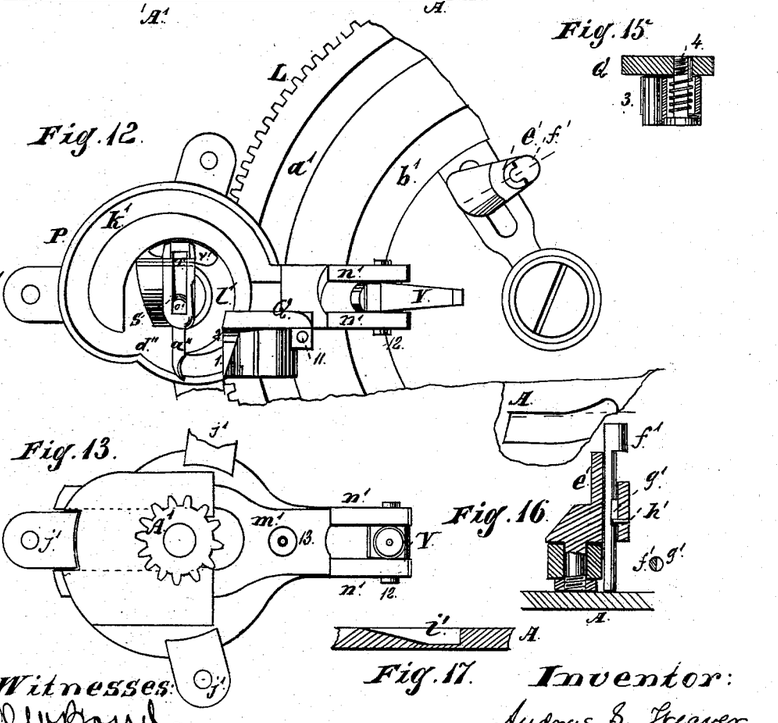
Fig. 12 is a top view of the parts represented, the platform being removed.
Fig. 13 is an under side view of the casting P.
Figure 18:
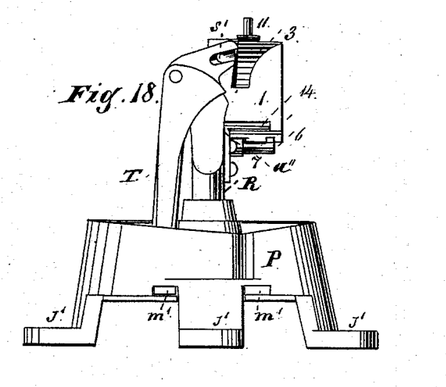
Figs. 18 to 28, inclusive, are also details. All these details from Figs. 14 to 28 are enlarged.
Figures 19, 20, 21:
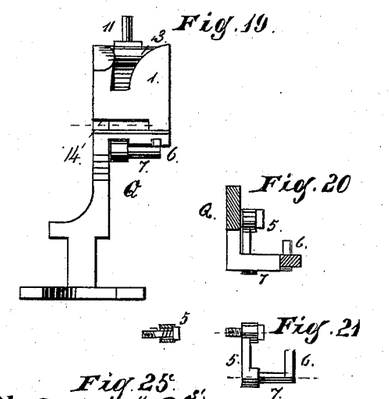

$i'$ is a recess in the plate A in the path of the pin $f'$, which recess is formed as shown in Fig. 17, and is inclined at one end.

P is a casting, of the form shown. It is secured to the plate A by means of screws or bolts, which pass through the feet $j'$. Its upper side is provided with deep grooves $k'$ $l'$, of the form shown in the drawings.

Q is an upright piece of metal, which carries the cord-grippers. It is secured to a bar, $m'$, which has a sliding movement in a passage provided in the piece P. At one side of P are two arms, $n'$, between which the lower end of Q is placed and supported. There are shoulders on Q, which rest on the upper edges of the arms $n'$.

Figures 22, 23, 24, 25, 26, 27, 28:
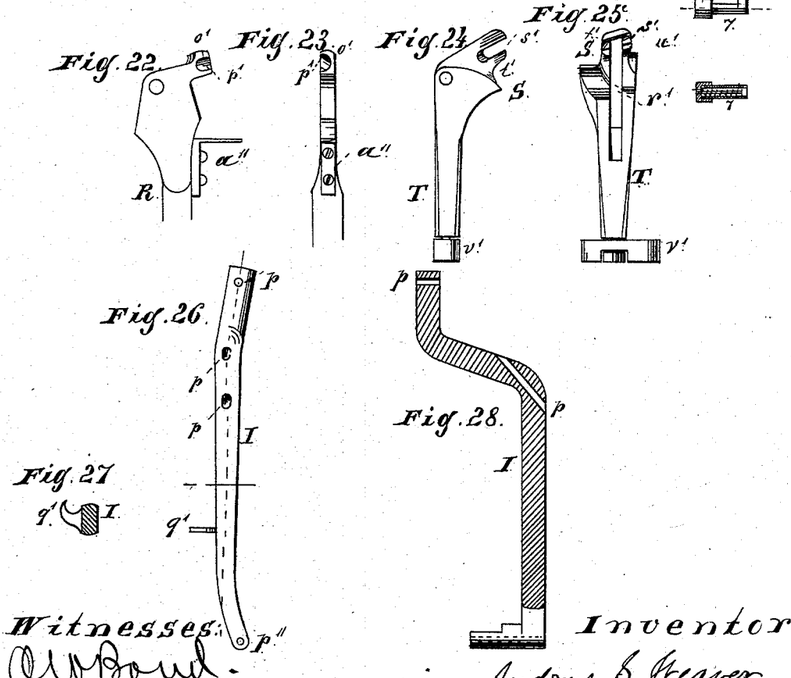

R is a shaft which passes through and rotates in the casting P, and on the lower end of which is a pinion, A', which engages with the wheel L. The upper part of this shaft is flattened and otherwise formed, as shown in Figs. 22 and 23, $o'$ being a projection on the top to prevent the cord from slipping off until the proper time arrives, and $p'$ being a groove in one side to allow the hook $q'$ on the needle to pass and catch the cord and slip it off from the knot-tyer.

S is a jaw or head, having a slot, $r'$, through it, which passes over the upper part of R, to which this head S is pivoted. In the top of this head is a hole, through which the projection $o'$ can pass.

$s'$ is an open slot through the jaw or head S. The slot $r'$ in this head divides what would otherwise be the continuous lower wall of the slot $s'$ into two parts, $t'$ $u'$, the latter of which aids in holding the severed ends of the cord, as hereinafter more fully stated.

T is an arm extending down from the head S, and on its lower end is a shoe, $v'$, which travels in the grooves $k'$ $l'$ in the casting P.

The form of the casting Q will be seen in the drawings, especially in Figs. 11, 14, 18, 19. That part marked with the numeral "1" is in effect a small plate, having a notch, 2, in the top. The piece 3 is pivoted on a screw or pin, 4, secured to Q, (see Fig. 14,) and around such pin 4 is a coil-spring in a chamber in the piece 3, so arranged as to hold 3 against the inside of the plate 1, except when forced away. Another piece, 5, is pivoted to Q and provided with a spring in a similar manner. Upon the lower or outer end of 5 is a pin, on which is pivoted the piece 6 by a sleeve, 7, within which is a spring so arranged as to have a tendency to hold 6 in the position in Fig. 11, but permitting it to rise a little. The spring at the upper or inner end of 5 has a tendency to hold it up against the lower edge of the plate 1, but allows it to be forced away from it. A hook, 8, (see Figs. 10 and 11,) is pivoted to the under side of the elevated part of the table, having an extension, 9, at the rear, in which is a slot, 10, through which passes a pin, 11, which is secured to the upper end of Q.

U is a sliding bar, arranged on the under side of the elevated part of the table, in the front end of which is a notch.

V is a lever, the upper end of the long arm of which enters a hole in the sliding bar U, while the short arm extends down into the groove $b'$ in the face of the wheel L, and is provided with a friction-roller. This lever is pivoted at 12 to the arms $n'$, between which it passes. To the under side of the sliding plate or bar $m'$ is secured a pin, which extends down into the groove or channel $a'$ in the face of the wheel L, and is provided with a friction-roller, 13.

In the plate 1 is a slot, 14. Secured to the shaft R is a knife or blade, $a''$, arranged to enter the slot 14 and cut the cord.

The devices are to be so located and arranged that the grain will be delivered by the rake or otherwise in proper position for being bound.

Figure 1:
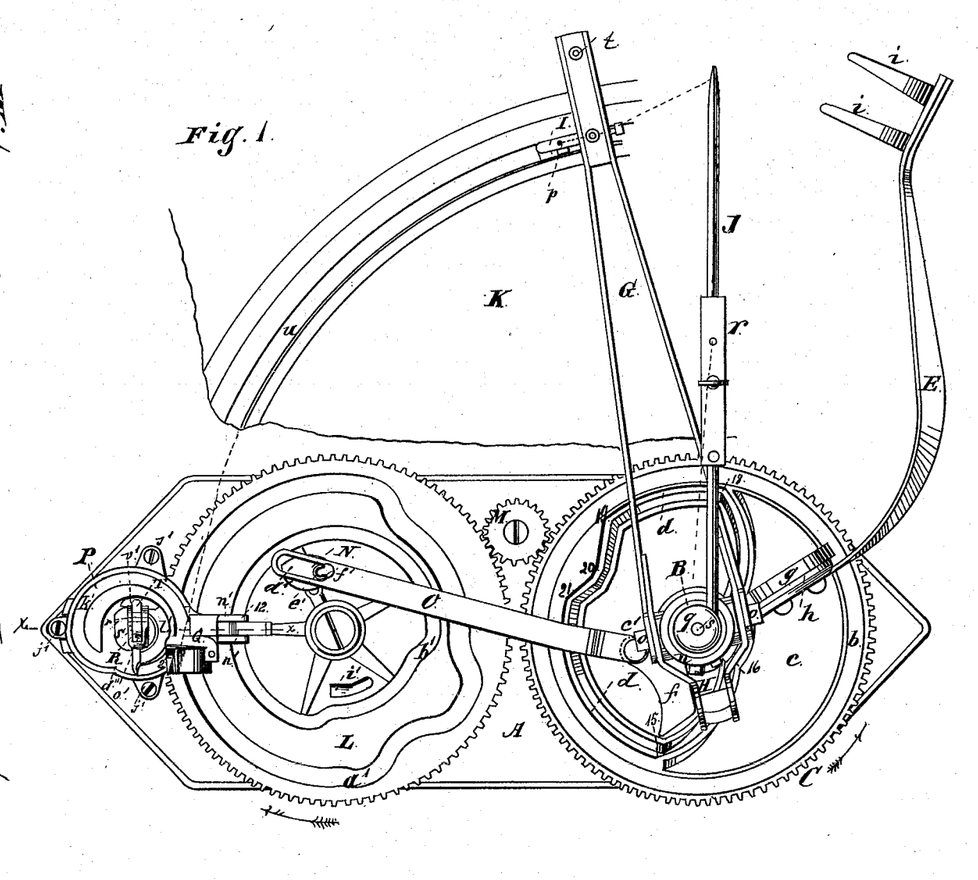
Figure 1 is a plan.
Figures 2, 3, 4, 5:
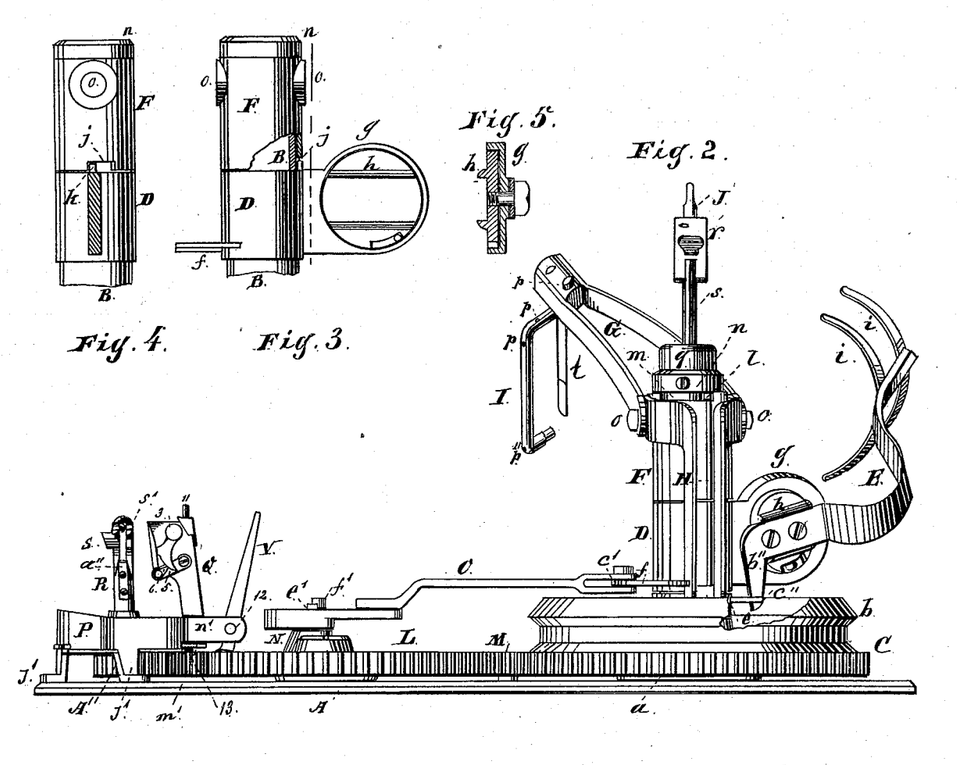
Fig. 2, an elevation.
Figs. 3, 4, and 5 are details.
Figures 6, 8, 9:
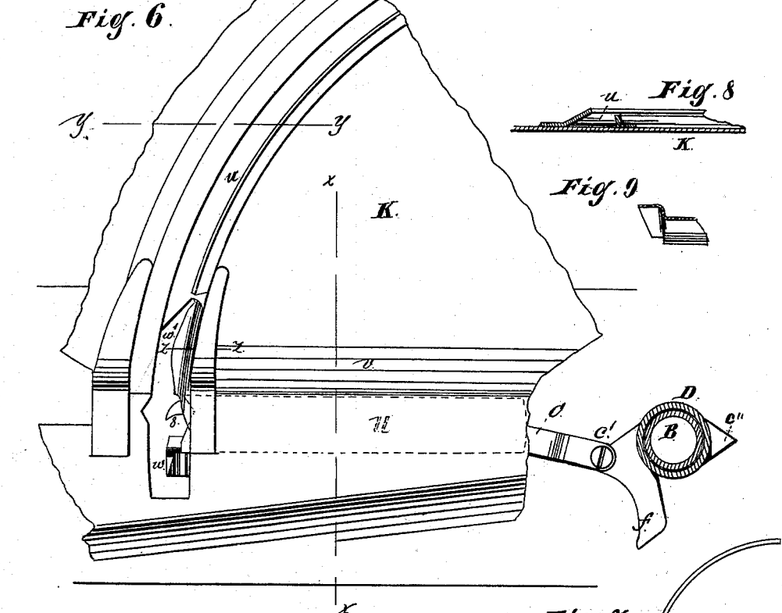
Fig. 6 is a top view of the parts, except that the standard and sleeve are in section.
Fig. 8, a section at $y$ of Fig. 6.
Fig. 9, a section at $z$ of Fig. 6.
Figure 32:
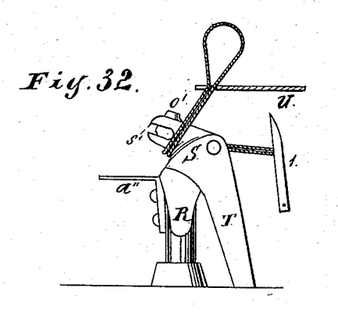
Figs. 32, 33, 34, and 35 are details showing the knot-tyer and the cord in various positions while the knot is being tied.
Figure 33:
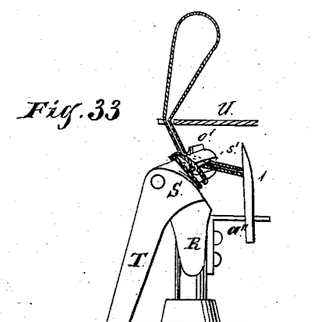
Figure 34:
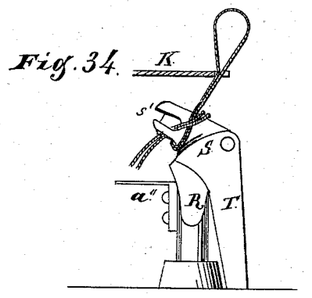
Figure 35:
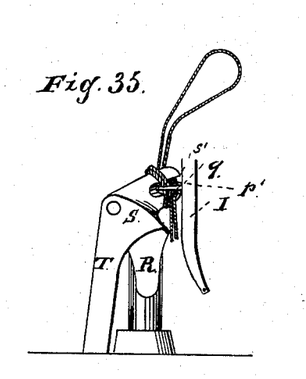
Figure 36:
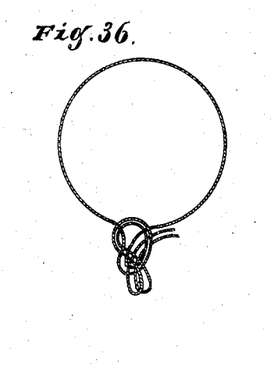
Fig. 36 shows the position of the cord after the same has been slipped from the knot-tyer and before the knot has been drawn tight.

The operation is as follows: Suppose the parts to be in the position shown in Figs. 1 and 2, the end of the cord having been placed in the grippers and that part of the cord which is on the table being in the groove *u*. Suppose, also, that a sufficient quantity of grain to form a bundle has been delivered on the platform in suitable position to be bound. Now, if the wheel L be rotated in the direction indicated by the arrow in Fig. 1, motion will be given to the wheel C through the pinion M. At the same time, the pin N being at the inner end of the slot *d'*, the action of the rod or connecting-bar O will cause the sleeve D to rotate on the standard B, and the outer end of the piece *f*, which extends out from the sleeve D, then being in contact with the extension H at the rear of the needle-arm, which is pivoted to the sleeve F, such sleeve F will also rotate on the standard B, carrying the needle-arm with it, and causing the needle and the cord to be carried over the gavel toward the knot-tying devices, the end of the needle-arm which carries the needle, having then been raised sufficiently for this purpose. This movement being continued, the needle will be brought over the slot *w* in the table, and will pass down through such slot carrying the cord down over the hook 8. The needle will pass down between the plate 1 and the piece 3, taking the cord between these two parts, between which it will be caught and held by the action of the spring in 3. Continuing to descend, the needle will come in contact with piece 5, forcing it away from the edge of the piece or plate 1, and will pass down in front of this piece 5, and the cord will be caught and held between this piece 5 and the edge of plate 1 by the action of the spring provided for that purpose. Then the sliding bar U will be moved forward, pushing the cord over the knot-tying devices, and at the same time the gripper will be moved forward a little also, carrying that part of the cord which is in the grippers near to the knot-tyer and blade. The sliding bar U is moved both forward and backward by the action of the irregular groove *b'* upon the lower end of the lever V, and the grippers are also moved both forward and backward by the action of the irregular groove *a'* upon the friction-roller 13, on the pin which is secured to the under side of the sliding bar *m'*, upon which the grippers are mounted. The knot-tying devices will be constantly rotated by the action of the wheel L on the pinion A''. When the bar U and the grippers have been carried forward, as above stated, the cord will be caught by and over the end of the knot-tying devices, and at the same time the knife *a''* will enter the slot 14 in plate 1 and sever the cord, the two ends of the band being held in the upper gripper, the parts then being very nearly in the position shown in Fig. 18. Then the grippers will be carried back, holding the two ends of the cord about the bundle, and will take sufficient cord from that around the bundle to allow the knot to be formed. The compressor E will at this time be compressing the bundle, and the slack cord thus obtained will be used in tying the knot. At this time the remaining part of the mechanism will be relieved from strain, all, or nearly all, the strain then being on the compressor. Next the gripper will be carried forward again, and the needle, which has been standing still, will rise, passing up behind the lower gripper and between the plate 1 and piece 3, opening the upper gripper and releasing that part of the cord around the bundle, the lower gripper retaining and holding the cord from the needle, which cord will also be carried up and be caught and held in the upper gripper. The needle rises just above the hook 8, the sliding bar U being at the same time carried back, and the gripper will be again carried back, and by the movement of the pin 11 in the slot 10 in the rear end, 9, of the hook 8 the hook will be turned so as to catch the cord when the needle passes out over the platform. As soon as the gripper has been carried back, as last stated, the needle will descend to the level of the table, and will be ready to pass out over the table. At this time the knot-tyer has made two revolutions since it first caught the cord, as before stated, bringing the cord into the various positions shown in Figs. 32, 33, 34, and 35, the knot-tyer having performed about three-fourths of a revolution, as shown in Fig. 32, about one and a quarter, as shown in Fig. 33, and about one and three-quarters, as shown in Fig. 34. At this point the two ends of the cord about the bundle will be caught and held between the side of the upper part or end of the shaft R and the lip *u'* on the head S, and this is just before the said two complete revolutions have been made. The needle rests a moment in the position last described, and then passes out in a horizontal line from the slots *w* and *w'*, and in passing the hook *q'* on the needle passes through the slot *s'* in the head S, catches the cord, and slips it from this head, which is then raised up, so that the cord does not catch on the projection *o'*. At this point the arm *t* and the needle come in contact with the bundle and begin to move it, and the two ends of the cord around the bundle being still held in the knot-tyer, the strain on the cord caused by moving the bundle draws the knot down tight, forming a completed knot, as shown in the drawings. At this time the shoe *v'* passes into the groove *k'* in the casting P, and opens the lip or jaw *u'*, releasing the cord. The needle-arm continues its movement over the table, and the bundle is swept off onto the ground, the compressor E being then raised to allow the bundle to pass under it, which raising is caused by the projection *b''*, at the heel of the compressor, coming in contact with the projection *c''* on the fixed collar *e*. While the bundle is being removed the needle moves in the groove *u* in the table, laying down cord for the next bundle, and when it reaches the farthest return-point another bundle will be brought onto the table, the needle-arm will rise up to the position first above mentioned in describing the operation, and the described operation will be repeated.

I will now describe the operation of some parts more fully than has been done.

The movements of the needle-arm are controlled by the arm $f$ on the sleeve D, by the movement of the end of the extension H in the groove $d$ in the wheel C, and by the pin $k$ on the sleeve D. Commencing at the position shown in Figs. 1 and 2, the needle-arm is brought over the slot $w$ by the action of the arm $f$ on the sleeve D, which comes in contact with the extension H, as before stated, motion being given to the arm by the rotation of the sleeve D, caused by the action of the connecting-rod O. It is then forced down by the action of the slot or channel $d$, in which the end of the extension H travels. The several movements of the needle before it is ready to leave the slots $w$ and $w'$ are also controlled by the groove or channel in which said extension H travels. After the bundle has been bound the compressor is returned back over the table to be ready for another bundle by the pulling action of the rod or bar O, which causes the sleeve D, which carries the compressor, to rotate in a direction opposite to that in which it rotated when the compressor moved over the table to compress the bundle. At the same time the needle-arm is also returned, because the pin $k$ on the upper edge of the sleeve D comes in contact with the edge of the slot $j$ in the sleeve F, and thus the two sleeves D and F, one carrying the compressor and the other the needle-arm, move together. When the lateral movement of the compressor is nearly completed the projection $b''$ on the inner end of the compressor E passes over the inclined edge of the projection $c''$ on the fixed collar $e$ and causes the outer end of the compressor to rise, so that the bundle can pass under it; and when the end of the extension H on the rear of the needle-arm reaches the point marked 15, Figs. 1 and 31, in the slot or channel $d$ it will be depressed, and the needle-arm will be raised to the position shown in Fig. 2, ready to pass over another bundle and repeat the operation first described.

The post N, when at the inner end of the slot $d'$ in the bar O, pushes such bar, and when at the other end of such slot it pulls such bar, and while the post is traveling from one end to the other of such slot $d'$ the bar O remains stationary and the sleeve D stands still, with the parts connected thereto. The slot $d'$ in the bar O is of the proper length to allow the slotted end of the bar O to rotate around the center of the wheel L with the post N, and also of such length as to allow the post to come in contact with the inner end of the slot at the proper time to give motion to the sleeve D.

It is desirable, as the machine is constructed, to have the needle move out from the slots $w$ and $w'$ in the table a little sooner than it will with such a slot and a post of ordinary construction; and I practically shorten the slot at the outer end by making the post N in two parts, as described. When the part $f'$ reaches the recess $i'$ in the plate A this part $f'$ drops into $i'$, and the enlarged upper end of $f'$ falls down into the slot $d'$, and the bar O begins to move a little sooner than it otherwise would, and as the lower end of $f'$ passes over the inclined part of the recess $i'$ the upper end is lifted out from the slot $d'$, the smaller part of $f'$ comes in contact with the end of the slot, and the slotted end of the bar O can pass the center.

The slot $m$ in the upper end of the sleeve F and the pin $l$ serve the purpose of a stop to limit the movement of the needle-arm to the left or right.

The head of the knot-tyer is moved up and down a little at the point by the movement of the shoe $v'$ in the channels $k'$ $l'$ in the casting P. The point $d''$ causes the shoe to pass from $k'$ into $l'$, and also from $l'$ into $k'$. When the shoe $v'$ is in the channel $k'$ the point of the head of the knot-tyer will be thrown down, and when the shoe is in $l'$ such point will be raised to its highest position.

The wheel C need not be made exactly as described. It may be provided with arms extending from the hub to the rim, and the channel $d$ can be cast upon such arms and with the rim.

The lower end of the extension H travels in the groove $d$. From the point marked 15 to 16 the needle rises. It remains in such raised position as it passes over the bundle, and until H reaches the point 17. From 17 to 18 the needle gradually descends. From 18 to 19 it stands still. From 19 to 20 it rises. From 20 to 21 it again descends through $w$ to a level with the table. Then it remains stationary until the pin $k$ comes in contact with the side of the slot $j$. Then the two sleeves D F and the wheel C travel together, the end of H remaining in about the same position in the slot until the sleeve D ceases to move. Then C moves along, H remaining in the slot until it reaches the point 15 again.

By curving the table K downward from the highest point, as shown at $v$, the binding-table is located at as low a point as is necessary, and the arrangement of the wheels L and C and the casting P in about the same plane requires but little vertical space for these parts, so that they can be easily located beneath the platform.

The mechanism is to be connected with a reaper or harvester in any suitable manner, depending somewhat upon the machine with which it is to be used.

I have shown only so much of a platform as is necessary to illustrate my invention.

The piece Q and parts connected therewith to hold the cord may be called the "grippers."

The shaft R, with the head S and arm T, may be called the "knot-tying" devices.

It will probably usually be more convenient to use the cord directly from a ball, instead of from a spool, the cord being placed in a suitable box or other receptacle.

What I claim as new, and desire to secure by Letters Patent, is as follows:

1. The combination of a main wheel, L, provided with grooves $a'$ $b'$, a casting, P, to carry the knot-tying devices and grippers, and a wheel, C, provided with a groove, $d$, said three parts, L, P, and C, being arranged substantially as and for the purposes specified.

2. The wheel C, provided with a groove or channel, $d$, in combination with a standard, B, sleeve D, with projecting arm $f$, sleeve F, and needle-arm G, pivoted to the sleeve F, and having a rear extension, H, traveling in the groove $d$, substantially as and for the purposes specified.

3. The combination, in a grain-binder, of the compressor E, connected with sleeve D, and arranged to sweep the platform, with the needle-arm G pivoted upon the sleeve F, and arranged to rise when the compressor commences its travel toward the knot-tying mechanism, and to then travel forward simultaneously with the compressor, all constructed and adapted for operation substantially as described.

4. The combination, with the spring-grippers, of the needle I, bent at its lower end, as described, the stationary plate 1, and the pivoted gripper 3, normally held against said plate by spring-pressure, said needle being arranged so that its bent lower end will pass between the two jaws thus formed both in its descent and in its ascent, in the manner and for the purpose specified.

5. A cord-gripper consisting of a standard, Q, having thereon a plate or piece, 1, and the parts or pieces marked 3, 5, and 6, substantially as specified.

6. The knot-tying devices consisting of the shaft R, and head S, with the arm T, said parts being constructed substantially as described, in combination with the casting P, provided with channels $k'$ $l'$, substantially as set forth.

7. The combination, with the wheel L, for actuating the knot-tying mechanism and carrying pin or post N, of the slotted bar O and the sleeve D, arranged upon standard B, and carrying the compressor-arm, the slotted bar being pivoted to arm $f$ upon the sleeve, said members being constructed and arranged for operation substantially as described.

8. The combination, in a grain-binder, of the needle and the knot-tying mechanism, with the slide-bar U arranged to carry the cord over the knot-tying devices after the cord has been brought down by the needle and grasped by the gripping mechanism, and the vibratory lever V, arranged to actuate the slide-bar at the proper moments, substantially as described.

9. The wheel L, provided with grooves or channels $a'$ $b'$, in combination with the cord-grippers, knot-tying devices, sliding bar U, lever V, and sliding plate or bar $m'$, substantially as and for the purposes specified.

10. The needle I, provided with a hook, $q'$, in combination with the knot-tying devices for the purpose of removing the cord from the head S, substantially as specified.

11. The knife or cutter $a''$ on the shaft R of the knot-tying devices, in combination with the slot 14 in the standard Q, substantially as specified.

12. The hook 8, arranged so as to catch and hold the cord at the proper time during the descent of the needle-arm, and provided with a slotted extension, 9 10, in combination with the pin 11 upon the part Q, carrying the gripping devices, substantially as specified.

13. The combination, in a grain-binder, of a platform provided with fixed arms, between which and the horizontally-movable compressor the gavel is held while being bound, and the vertical vibratory and horizontal oscillatory needle-arm carrying the needle, and provided at its outer end with the arm $t$, constructed and arranged for delivering the bound gavels substantially as described.

14. The post N, made in two parts, $e'$ $f'$, in combination with the slotted bar O and slot $i'$, substantially as specified.

15. The compressor E, provided with an arm, $b''$, in combination with the sleeve D and fixed projection $c''$, for the purpose of elevating the outer end of the compressor to allow the bundle to pass under it, substantially as specified.

16. The combination, in a grain-binder, of the plate or casting P, having an outer channel, $k'$, provided with a guiding projection or point and an inner channel, $l'$, having an opening in its wall, with the shaft R, provided with the knot-tying devices, and arranged to rotate in said plate or casting, and the pivoted arm T, having a jaw or head, S, at its upper end, and at its lower end having a shoe arranged to travel in the casting P, in order to effect the requisite movement of the knot-tying devices, substantially as described.

ANDRUS S. WEAVER.

Witnesses:
E. A. WEST,
O. W. BOND.